UNITED STATES PATENT OFFICE.

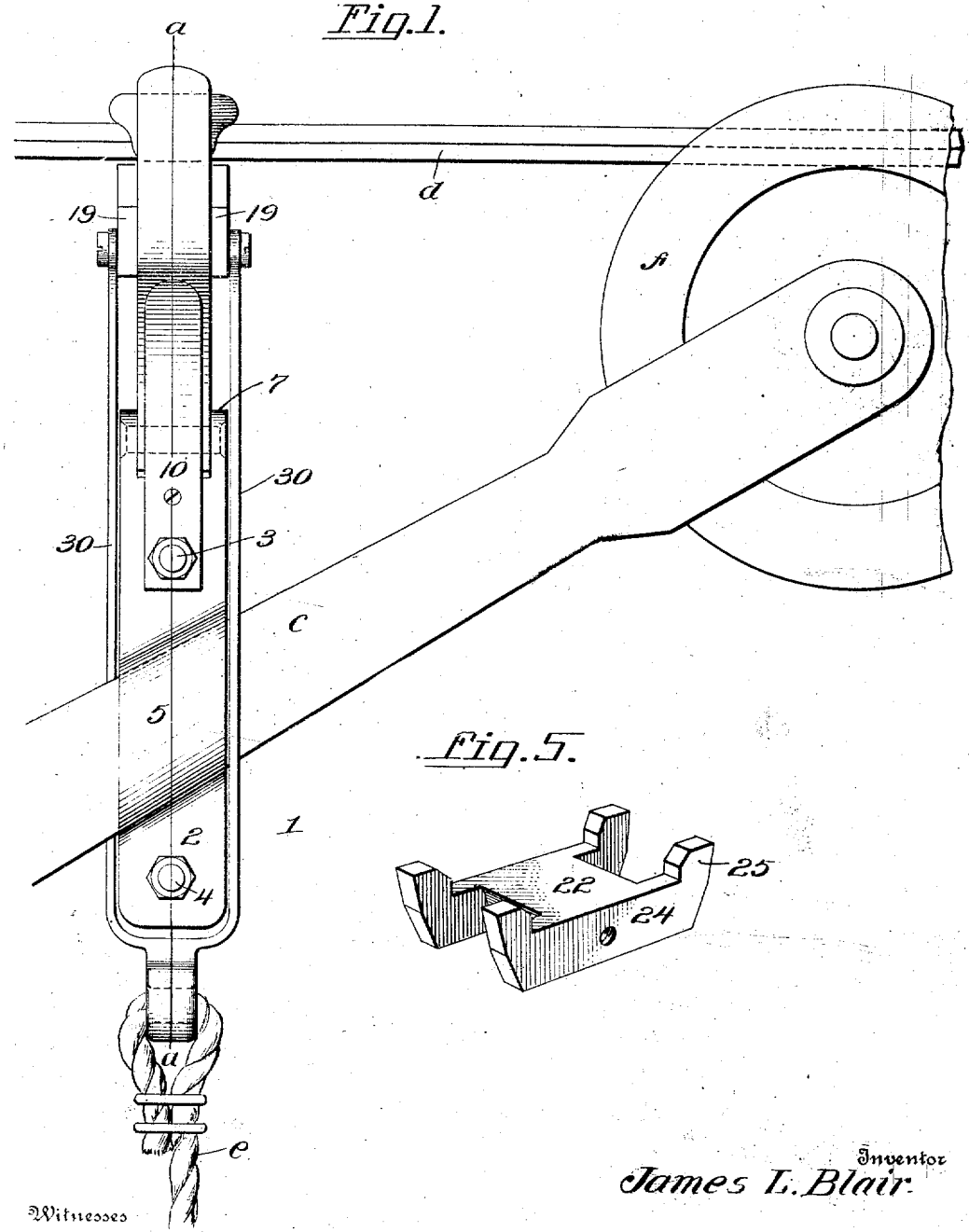

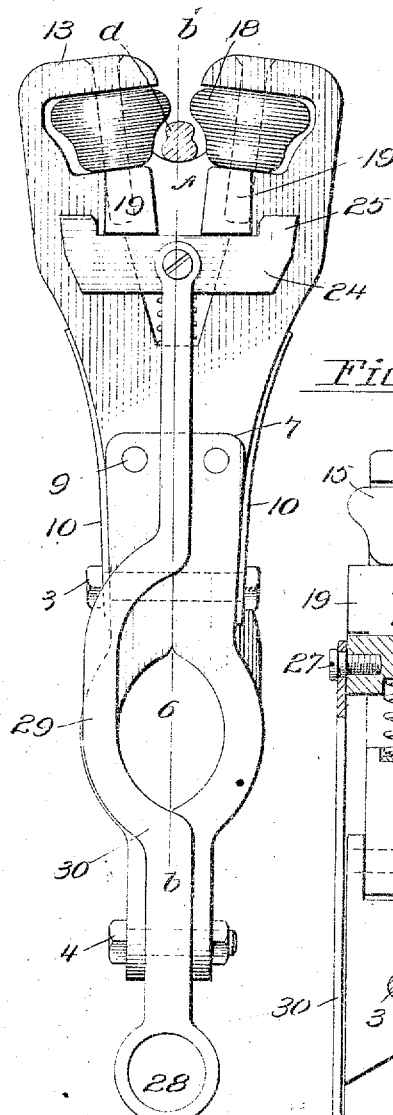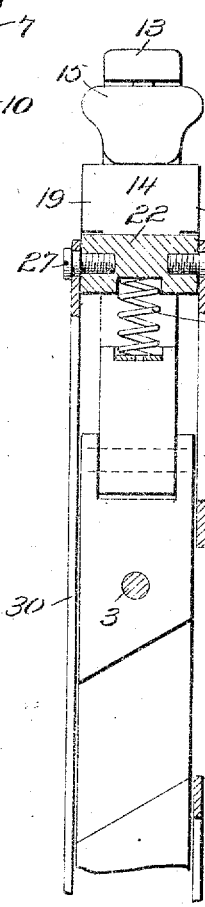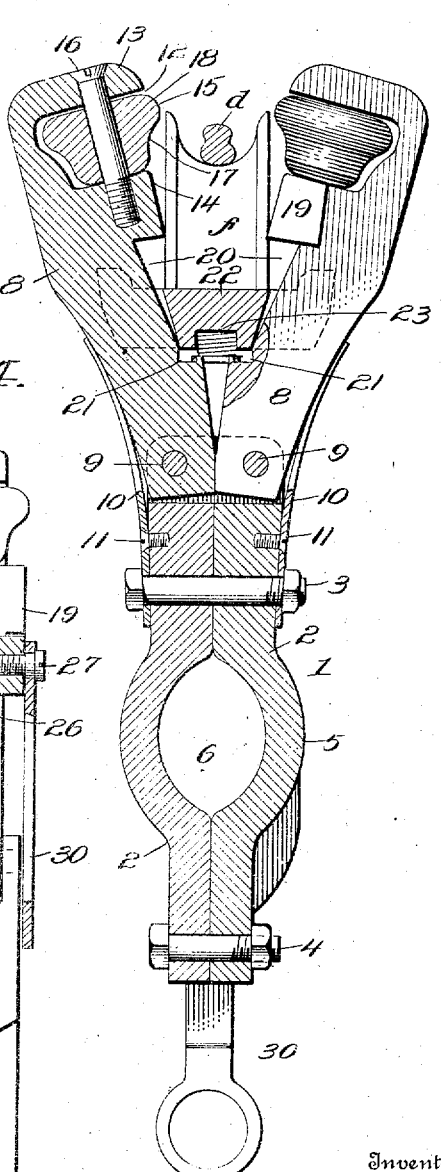

JAMES L. BLAIR, OF BUTLER, PENNSYLVANIA.

TROLLEY SAFETY-LOCK.

966,301.   Specification of Letters Patent.   Patented Aug. 2, 1910.

Application filed July 2, 1909. Serial No. 505,644.

*To all whom it may concern:*

Be it known that I, JAMES L. BLAIR, a citizen of the United States, residing at Butler, in the county of Butler and State of Pennsylvania, have invented new and useful Improvements in Trolley Safety-Locks, of which the following is a specification.

This invention relates to improvements in trolley safety locks for use on the trolley poles of electric railway cars to prevent the trolley wheels from leaving the trolley wire and the said invention consists in the construction combination and arrangement of devices hereinafter described and claimed.

One object of the invention is to provide an improved device of this character which is automatic in operation so that the fender jaws which lie opposite each other on opposite sides of the trolley wire are automatically opened when the trolley pole is lowered and close automatically toward opposite sides of the wire when the trolley pole is raised to apply the trolley wheel to the trolley wire.

A further object of the invention is to effect improvements in the construction of the fender jaws and of the device which automatically releases and locks them.

In the accompanying drawings:—Figure 1 is an elevation of a trolley lock constructed in accordance with this invention showing the same on a trolley pole and in use. Fig. 2 is an elevation of the same at right angles to Fig. 1. Fig. 3 is a vertical sectional view of the same on the plane indicated by the line *a—a* of Fig. 1. Fig. 4 is a sectional view of the same on the plane indicated by the line *b—b* of Fig. 2. Fig. 5 is a detail perspective view of the fender jaw locking and opening key.

The base or body portion 1 of my improved trolley lock is here shown as composed of a pair of plates or castings 2 secured together near their upper and lower ends by bolts 3, 4 and formed near their central portions with offsets 5 which form an eye 6 between them for the reception of the trolley pole *c*, the said bolts 3, 4, serving to clamp the said plates or sections firmly together and to the trolley pole so that when the trolley pole is elevated the trolley lock is disposed in a vertical position. The upper ends of the said plates or sections are formed with a pair of upwardly extending lugs 7 and a space between said lugs in which space are disposed the lower ends of a pair of fender jaws 8, said fender jaws being pivotally mounted at their lower ends as at 9. A pair of springs 10 are placed on opposite sides of the upper portion of the base or body 1 with their lower ends bearing against the upper portions of the sections 2 and secured thereto by screws 11, the bolt 3 also extending through openings near the lower ends of said springs and hence serving to secure said springs to the base as well as assisting in securing the sections of the base together. The upper portions of the said springs bear against the outer sides of the fender jaws and serve to normally force said jaws toward each other to normally maintain the upper ends of said fender jaws close together and on opposite sides of the trolley wire *d* which is here shown as substantially pyriform in cross section. Each fender jaw has a recess 12 near its upper end on its inner side providing an inwardly extending overhanging arm 13 and a base portion 14. Anti-friction rollers 15 are mounted in the said recesses, preferably on the unthreaded surfaces of screws 16 which extend downwardly through said arms 13 and the central bearings of the rollers and the lower screw threaded ends of which are engaged with the thread openings in the base portions 14. The said anti-friction rollers are preferably of the form here shown substantially inverted pyriform outline providing concave opposing surfaces 17 to approach the trolley wire and overhanging flanges 18 to bear above the trolley wire as shown in detail in Fig. 2. These anti-friction rollers may be made of any suitable material.

On the front and rear sides of the fender jaws and just below the rolls 15 are projecting lock shoulders 19. Portions of the opposing inner surfaces of the fender jaws immediately below the base overhangs or shoulders 14 are inclined and converge downwardly as at 20 and at the lower ends of said inclined downwardly converging surfaces are shoulders 21. A locking and releasing key block or device 22 has a wedge shaped central portion 23 which operates between the downwardly converging opposing walls or wall surfaces 20 of the fender jaws and is further provided with arms 24 which bear and are disposed to move vertically on the front and rear sides of said fender jaws and are provided at their ends with upwardly extending locking shoulders 25. In the under side of the central portion of said key 22 is a recess which receives the upper end of a spring 26, the lower end of said spring being mounted on the shoulders 21. The said spring normally moves the key upwardly and keeps the same bearing directly under the locking shoulders 19 of the fender arms so that the locking shoulders 25 of the key coact with said lock shoulders 19 of the fender arms to normally lock the fender arms in closed position with their anti-friction rollers close to and on opposite sides of the trolley wire. A pair of links 30 have their upper ends pivotally connected to the key as at 27 and have their lower ends bent toward each other and provided with eyes 28 for the reception of the bight of the trolley rope *e*. The said links are provided with offsets 29 to clear the trolley pole. The trolley wheel is indicated at *f*.

The operation of my improved trolley wheel is as follows: When the trolley pole is up and the trolley rope *e* is slack, the key as hereinbefore stated locks the fender jaws in coaction with the anti-friction rollers which they carry and prevents the trolley wheel from leaving the wire as will be understood. When the rope *e* is pulled downwardly to lower the trolley pole and release the trolley wheel from the trolley wire, the initial tension of the rope draws the links 30 downwardly, said links draw the key downwardly against the tension of the spring 26, first causing the shoulders 25 of the key to clear the shoulders 19 of the fender jaws and then causing the wedge shaped central portion of the key by coaction with the downwardly converging opposing wall portions 20 of said fender jaws to force the latter apart or open them against the tension of the springs 10 hence entirely clearing the rollers 15 from above the trolley wire and permitting the trolley pole and wheel to be lowered. It follows that when the trolley pole is raised and the trolley wheel engaged with the trolley wire, the fender jaws are closed by the action of the springs 10 as soon as the rope *e* becomes slack and the key by the action of the spring 26 immediately causes its locking shoulders to reëngage those of the fender jaws and hence lock the latter in closed position.

What is claimed is:—

In a trolley lock, the combination of a base for application to a trolley pole, a pair of spring-pressed fender jaws connected to the base disposed for operation on opposite sides of a trolley wire movable toward and from each other and having locking shoulders, said jaws having downwardly converging surfaces on their inner opposite sides, a key having a wedge shaped portion disposed between and coacting with said downwardly converging surfaces of the fender jaws to move the latter apart when said key moves downwardly, said key being further provided with shoulders to coact with those of the fender jaws to lock said fender jaws in closed position when the key is raised, a spring to raise said key and connections between said key and the trolley cord.

In testimony whereof I affix my signature in presence of two witnesses.

JAMES L. BLAIR.

Witnesses:
 THOMAS W. WATSON,
 J. F. MINTEER.